(12) United States Patent
Agrawal et al.

(10) Patent No.: US 7,987,461 B2
(45) Date of Patent: Jul. 26, 2011

(54) AUTOMATED DESIGN FOR DEPLOYMENT OF A DISTRIBUTED APPLICATION USING CONSTRAINT PROPAGATION

(75) Inventors: Aditya Agrawal, Cambridge, MA (US); Asit Dan, Pleasantville, NY (US); Tamar Eilam, New York, NY (US); Michael H. Kalantar, Chapel Hill, NC (US); Alexander V. Konstantinou, New York, NY (US); Heiko Hary Ludwig, New York, NY (US); John A. Pershing, Jr., Cortlandt Manor, NY (US); Hendrik Wagner, Stuttgart (DE); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1406 days.

(21) Appl. No.: 11/489,089

(22) Filed: Jul. 19, 2006

(65) Prior Publication Data

US 2008/0021873 A1    Jan. 24, 2008

(51) Int. Cl.
*G06F 9/45* (2006.01)

(52) U.S. Cl. ...................................................... 717/177

(58) Field of Classification Search .................. 717/177
See application file for complete search history.

(56) References Cited

U.S. PATENT DOCUMENTS

| 5,963,939 | A  | * | 10/1999 | McCann et al. | ................. 1/1 |
| 7,703,102 | B1 | * | 4/2010  | Eppstein et al. | .............. 718/104 |
| 2003/0172145 | A1 | * | 9/2003 | Nguyen | ....................... 709/223 |

OTHER PUBLICATIONS

Marcello Vitaletti et al., "Installable Unit Deployment Descriptor Specification" Version 1.0; W3CMember Submission; http://www.w3.org/Submission/InstallableUnit-DD/; Jul. 12, 2004; 228 pages.

* cited by examiner

*Primary Examiner* — John Chavis
(74) *Attorney, Agent, or Firm* — Tutunjian & Bitetto, P.C.; Preston J. Young, Esq.

(57) ABSTRACT

A system and method for automated design deployment for distributed applications includes providing a node with at least one requirement attribute in an application description. A repository for infrastructure elements is searched for candidate infrastructure elements for that satisfy the at least one requirement attribute. A candidate infrastructure element that best satisfies the at least one requirement attribute in the application description is substituted in place of the node with the at least one requirement attribute.

20 Claims, 6 Drawing Sheets

Substitution Example, part 1

AUTOMATED DESIGN FOR DEPLOYMENT OF A DISTRIBUTED APPLICATION USING CONSTRAINT PROPAGATION

BACKGROUND

1. Technical Field

The present invention relates to deployment of programs (e.g., in a data center), and more particularly to systems and methods which partially or wholly automate the decisions as to how programs are to be deployed. Given the requirements of the software, the systems and methods make choices regarding types of middleware and hardware that are most suitable.

2. Description of the Related Art

It is becoming more and more difficult for businesses to design, deploy, and manage today's (typically distributed) applications, partly because there are so many choices that need to be made about the "best" middleware, operating systems, and servers. Note that the definition of "best", in this context, changes from one deployment to the next. For example, in one case, optimizing may be for (minimal) cost, and in another case, optimizing may be for (maximal) performance.

One important issue in this context is the estimation of capacity requirements in the deployment planning. In the deployment planning, it has to be understood, e.g., how much capacity a particular application server running on a particular kind of server computer can accept. This capacity estimation can be used, together with cost information, to determine the quality of a deployment configuration.

SUMMARY

The shortcomings of the prior art are overcome and additional advantages are provided through the use of mapping algorithms, which convert the advertised capabilities of "higher level" units (e.g., application programs) into specific capacity and/or performance requirements for "lower level" units (e.g., middleware, operating systems, servers).

In a distributed application design system that manipulates distributed application descriptors and infrastructure element descriptors, these descriptors are annotated with enumeration attributes and range attributes, which represent capabilities of instances of the distributed application or infrastructure element, and requirements on other infrastructure elements.

A mapping algorithm is provided to each descriptor and sets the values of the requirements attributes based on input requirements which are applied to each descriptor's capabilities attributes. An optimal deployment is provided for a distributed application by iteratively matching its requirements with the capabilities of infrastructure descriptors, and applying the mapping algorithms to propagate attribute values to a next level of requirements, and then ranking the resultant set of potential solutions according to optimization criteria.

A system and method for automated design deployment for distributed applications includes providing a node with at least one requirement attribute in an application description. A repository for infrastructure elements is searched for candidate infrastructure elements for that satisfy the at least one requirement attribute. A candidate infrastructure element that best satisfies the at least one requirement attribute in the application description is substituted in place of the node with the at least one requirement attribute.

A distributed application design system includes a distributed application having at least one requirement node. The requirement node includes an application descriptor to represent capabilities of the distributed application. A repository of infrastructure elements has requirement descriptors representing capabilities of instances of the infrastructure element. A substitution module is configured to automatically substitute an infrastructure element from the repository with a requirement node based upon a best match between the application descriptor and the requirement descriptors.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with present principles include systems and methods, which automate selection of middleware, operating systems, servers, etc., taking into account the capabilities of the various elements of the infrastructure as well as requirements of a particular application deployment and optimization criteria.

It may be assumed that the distributed application is described as a directed graph, where nodes in the graph represent the individual deployable units of the distributed application (e.g., JSPs, servlets, Java code, EJBS, files, tablesets, etc.) and arcs represent the relationships among these elements (e.g., this Java code uses that tableset). These systems and methods can convert advertised capabilities of "higher level" units (e.g., application programs) into specific capacity and/or performance requirements for "lower level" units (e.g., middleware, operating systems, servers).

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

"Requirements" will be employed herein to mean engineering requirements or desired features imposed upon a program or device to properly satisfy the needs of an application. Requirement(s) should not be construed as limiting, and is not meant to limit aspects of the present embodiments.

Figure 1:
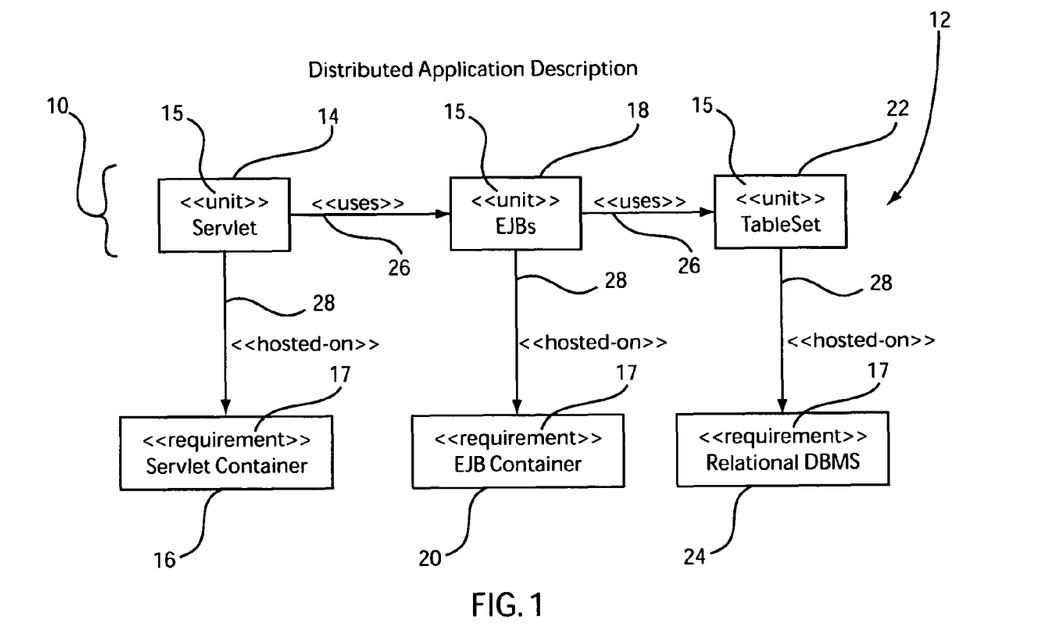
FIG. 1 is a diagram illustrating a distributed application, including three interrelated units, each having specific requirements.

Referring now to the drawings in which like numerals represent the same or similar elements and initially to FIG. 1, a directed graph 12 includes a distributed application description 10 provided to demonstrate aspects of the present embodiments. Nodes in the graph 12 represent the individual deployable units 15 of the distributed application, e.g., Java Server pages (JSPs), servlets, Java code, enterprise Java beans (EJBs), files, tablesets, etc.). In illustrative graph 12, nodes represent a servelet 14, an EJB 18, and a tableset 22. Arcs 26 represent the relationships among these elements (e.g., this Java code uses that tableset).

Additionally, there are other nodes in the graph which represent requirements 17 which are external to this application description 10, with arcs 28 leading from the various units 15 of the application to the nodes representing the requirements 17 of those units 15. FIG. 1 illustratively shows a servlet container 16, an EJB container 20, and a relational database management software (DBMS) 24.

For example, an EJB unit 18 may have a "hosted-on" arc 28 leading to a requirements node 20 specifying, perhaps, "EJB Container" or, perhaps more specifically, "WebSphere Application Server". An example of such a distributed application description is the Solution Module Definition of the Installable Unit Deployment Descriptor (IUDD) Specification (http://www.w3.org/Submission/InstallableUnit-DD/).

Additionally, it may be assumed that there is a repository 35 (FIG. 2) including descriptions of infrastructure elements. This may also be referred to as a "parts catalog". Each of these infrastructure element descriptions is structurally similar to the distributed application description, although these infrastructure elements may include only a single unit plus its requirements, rather than multiple units.

Figure 2:
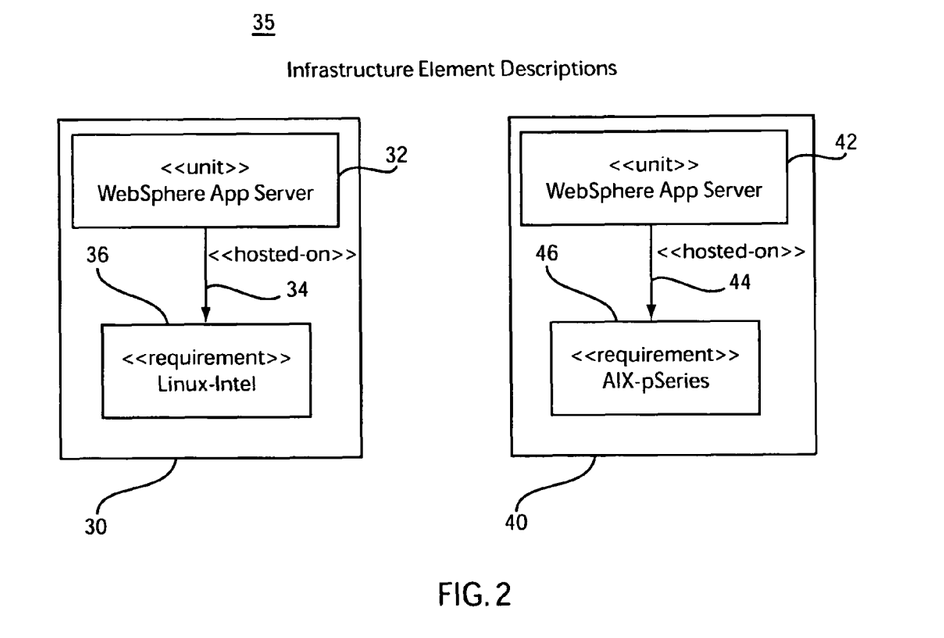
FIG. 2 is a diagram illustrating a number of infrastructure elements, each having a deployable unit with specific requirements.

Referring to FIG. 2, infrastructure element descriptions 30 and 40 are illustratively depicted in a repository 35. For example, there may be an element including a "WebSphere Application Server" unit 32, with a "hosted-on" arc 34 leading to a requirements node 36 specifying, perhaps, "Linux OS". Another illustrative element 40 may include a "WebSphere Application Server" unit 42, with a "hosted-on" arc 44 leading to a requirements node 46 specifying, perhaps, "AIX OS".

Referring again to FIGS. 1 and 2, a tool or a substitution module may be built to construct possible deployments of the distributed application 10 by iteratively finding a requirements node 17 in the application's directed graph 12, finding an infrastructure element (e.g., elements 30 or 40) in the repository 35 which matches that requirement, and replacing the requirements node 17 with a copy of the infrastructure element 30 or 40.

One problem with such a simple tool is that, for many of the requirements nodes 17 in the directed graph 12, there will be multiple infrastructure elements which match the requirement. For example, a requirement for a "J2EE Container" may match infrastructure elements for "WebLogic Server", "JBoss Server", and "WebSphere Server". Note, also, that there may be multiple elements for "WebSphere Server", themselves having different "hosted-on" requirements. So, the simple tool either emits the first deployment that it finds (undoubtedly sub-optimal), or it emits all possible deployments (undoubtedly too many choices, many of which will not meet the requirements of the deployment, and it is unclear whether they have actually helped the user with his deployment task).

In accordance with particularly useful embodiments, systems and methods employing a methodology which permits the tool to find only "good" solutions according to the deployment requirements, and to rank these solutions according to optimization criteria (e.g., cost, performance) are provided.

An attribute can be defined to be a name-value pair where the value is either an enumeration or a range. An enumeration is one or more discrete values, where the type of these values may be strings, numbers, or other suitable types. A range is a numeric inequality, such as "greater than 5" or "between 12.4 and 16.6", using a suitable notation. Each infrastructure element unit is decorated with one or more attributes, which specify the characteristics and capabilities of instances of this unit. For example, a "DB2" infrastructure element description may have a 'version' attribute which is an enumeration of "8.0", "8.1", and "8.2", a Transaction Processing Performance Council attribute, e.g., 'tpc-c' which is a range of "<200000", and a 'size-GB' attribute which is a range of "<20". 'tpc-c' is known in the art.

Figure 3:
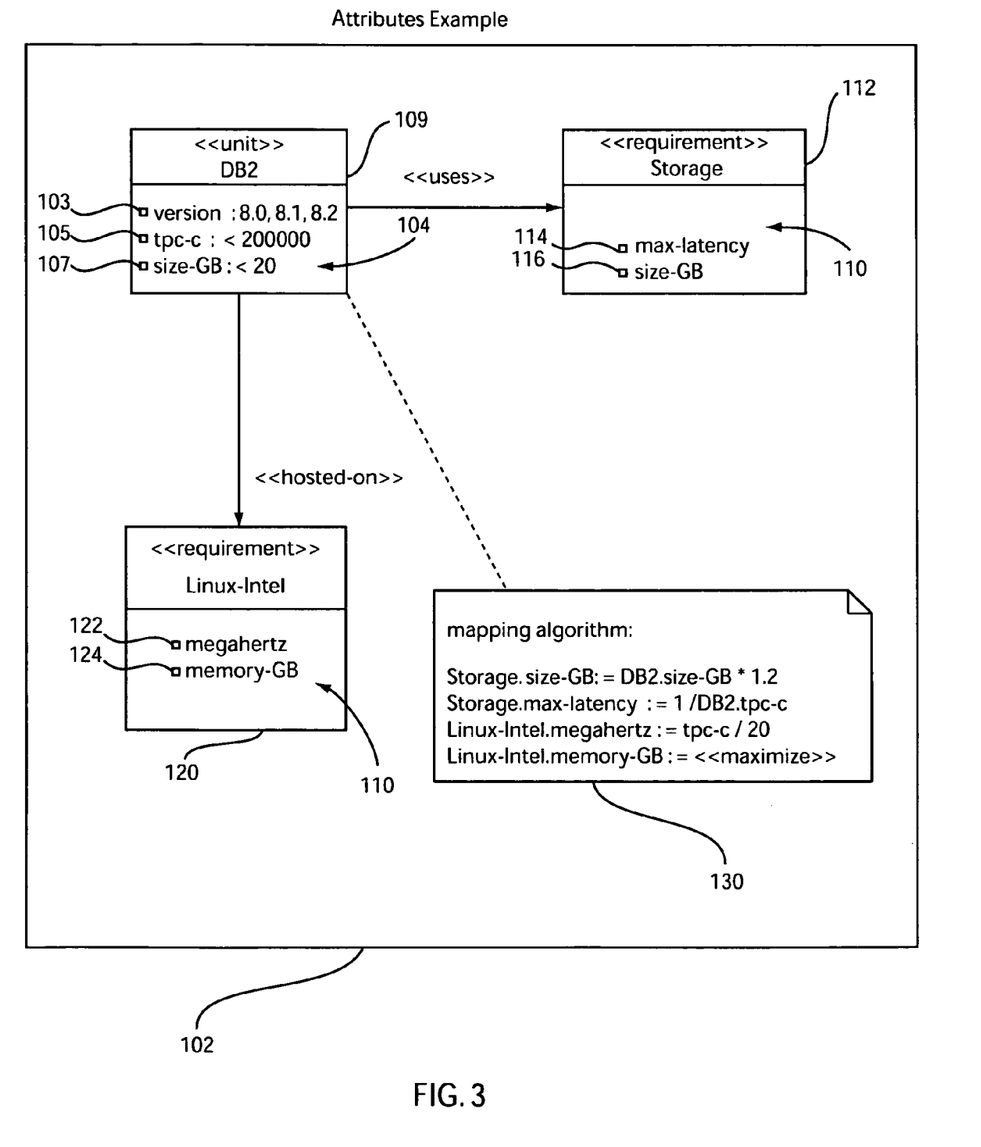
FIG. 3 is a diagram illustrating an infrastructure element in greater detail, and showing characteristics and capabilities of its deployable unit, its requirements, and a mapping algorithm which is used to transform the characteristics and capabilities values into values for the attributes of the requirements.

Referring to FIG. 3, an example of an infrastructure element 102 is shown employing attributes 104 in accordance with the present principles. Continuing with the example, the infrastructure 102 can provide a DB2 database instance 103 which is compatible with versions 8.0, 8.1, or 8.2, with a TPC-C benchmark performance 105 of up to 200,000 transactions/min, and a size 107 of up to 20 GB.

Each requirements node 106 and 108 in a distributed application description or an infrastructure element description 102 are decorated with one or more attributes 110, which specify the needed characteristics and capabilities of any infrastructure element instance which is chosen to replace this requirements node. For example, a "DB2" infrastructure element 102 may have a "uses" requirement 112 on a "Storage" element with 'max-latency' 114 and 'size-GB' attributes 116. It may also have a "hosted-on" requirement on a "Linux-Intel" element 120 with 'megahertz' 122 and 'memory-GB' 124 attributes.

Each infrastructure element description 109 has an associated mapping algorithm 130 which takes the characteristics and capabilities attributes of the unit 109 as input and maps their values into values which are assigned to the attributes on the requirements nodes 112 and 120. For example, the mapping algorithm 130 for the "DB2" infrastructure element description unit 109 may map the 'size-GB' 107 capability attribute to the 'size-GB' attribute 116 of the "Storage" requirement by increasing the value by 20% to take into account indexes and other overhead. Likewise, it will have some way of mapping the 'tpc-c' capability 105 into the 'latency' 114 and 'megahertz' 122 attributes on the "Storage" 112 and "Linux-Intel" 120 requirements.

This mapping algorithm 130 may be specified using some algebraic-like syntax, as illustrated in FIG. 3, or may be expressed in some suitable programming language, such as Java, which can be invoked to map the characteristics and capabilities attributes into the appropriate requirements attributes.

Figure 4:
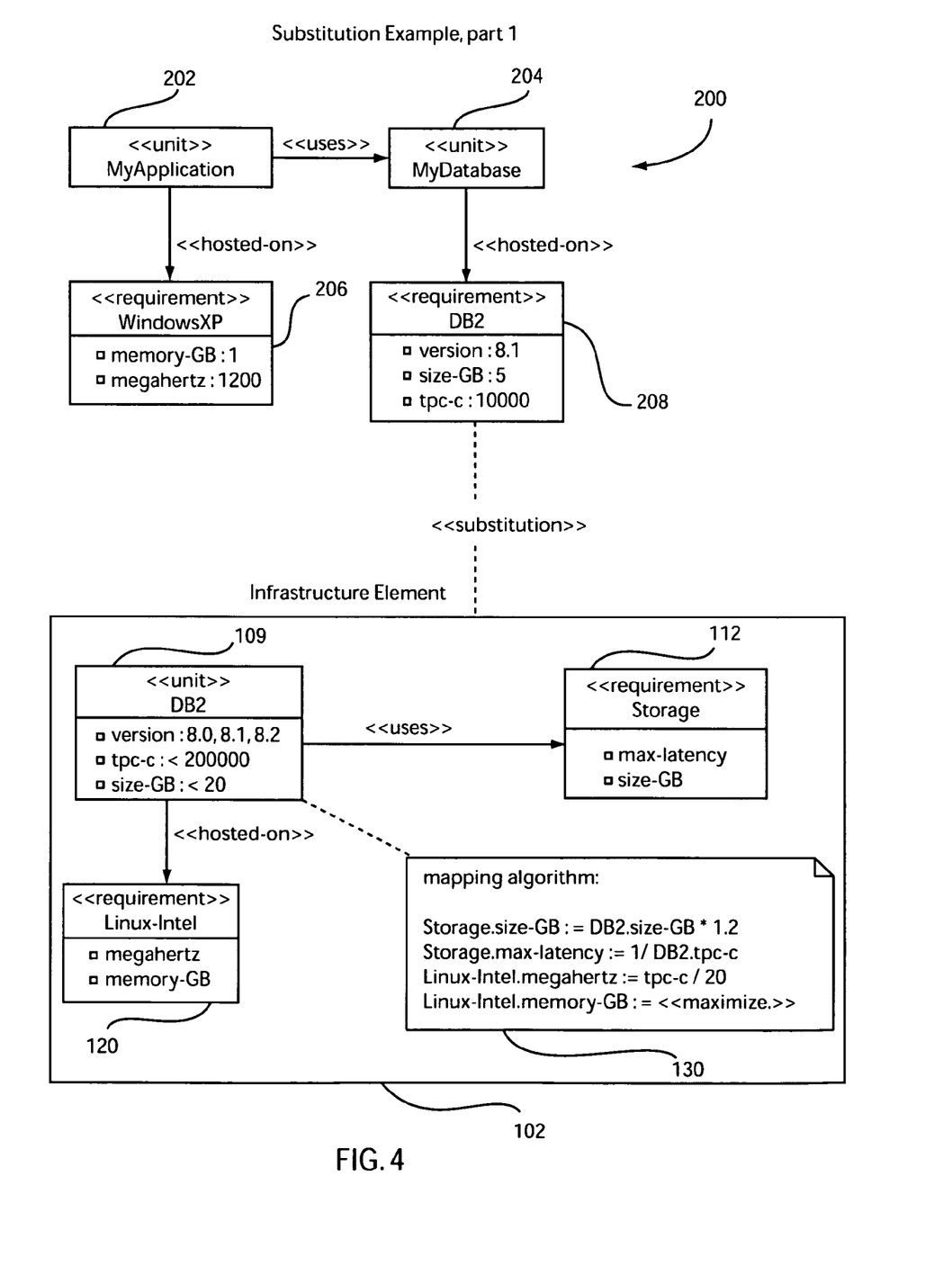
FIG. 4 is a diagram illustrating a start of a substitution operation, where an appropriate infrastructure element is selected to replace one of the requirements of the distributed application.

Referring to FIG. 4, an illustrative example is depicted to demonstrate substitution in accordance with present principles. To design a deployment for a distributed application 200, needed attribute values are specified for the various requirements nodes 206 and 208 of the distributed application description or, for some attributes, it may be specified that the attribute values are to be maximized or minimized. Then, for each requirements node 206 and 208, the set of infrastructure element descriptions (e.g., in a repository 35) is searched for those which match this requirements node. A match exists if the node type is compatible, and the needed values for the various characteristics and capabilities attributes fall within the range for that attribute or, for enumerated attributes, one of the enumerated values is matched.

Each infrastructure element description which matches is placed into consideration one at a time, replacing the requirements node; the values of the attributes of the requirements node are copied into the values of the corresponding characteristics and capabilities attributes of the unit of the infrastructure element. Then, the mapping algorithm is invoked to transform these "input" characteristics and capabilities values into the "output" attributes of the element's requirements node(s), if any.

Figure 5:
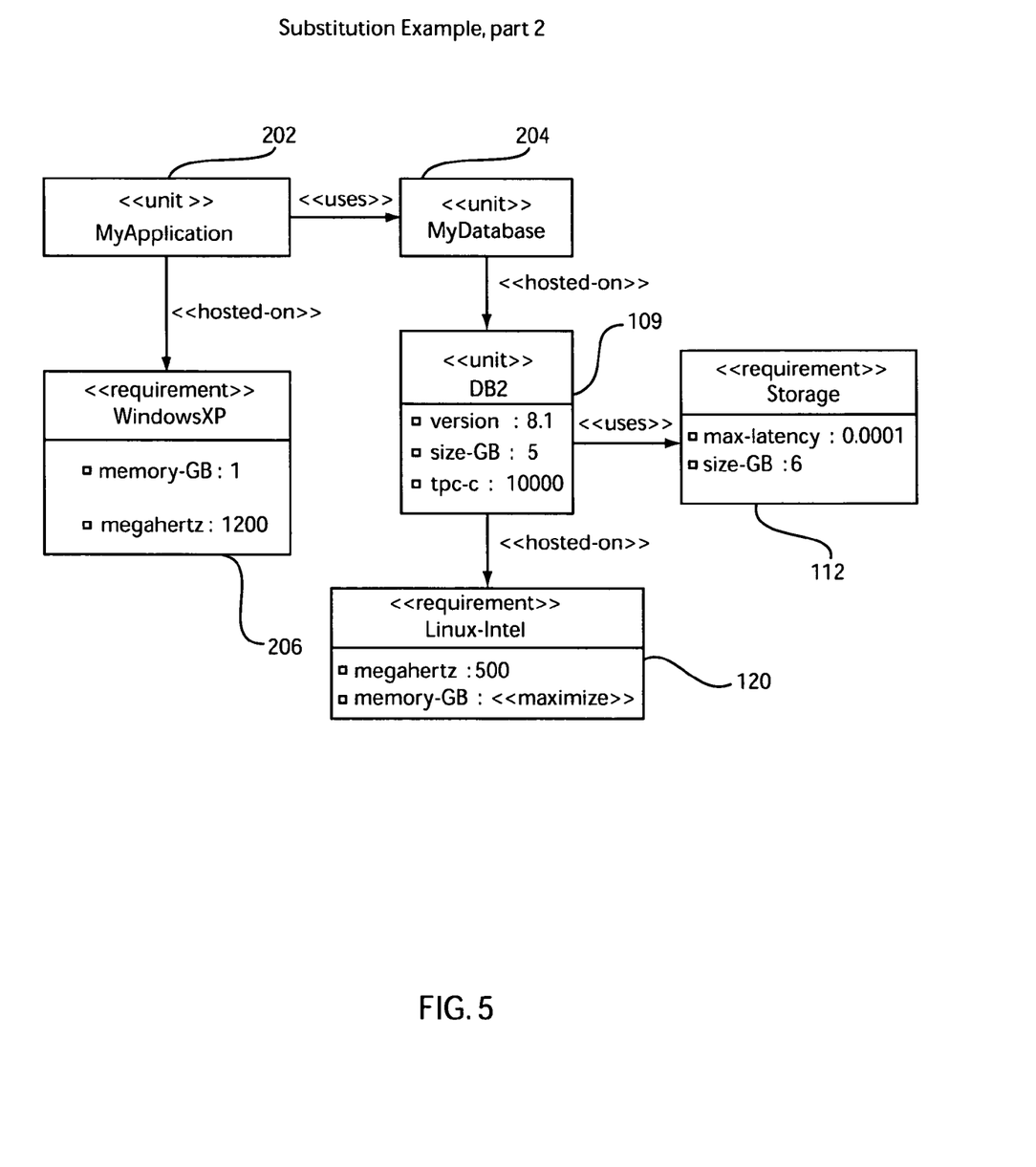
FIG. 5 is a diagram illustrating a result of the substitution operation, which brings a distributed application one step closer to full realization.

Referring to FIG. 5, in the example, shown in FIG. 4, the infrastructure element description 102 is matched, and the requirements node 208 is replaced (substitution) by infrastructure element 102. The values of the attributes of the requirements node 208 are copied into the values of the corresponding characteristics and capabilities attributes of the unit 109 of the infrastructure element 102. Then, the mapping algorithm 130 is invoked to transform these "input" characteristics and capabilities values into the "output" attributes of the element's requirements nodes 112 and 120.

This process iterates until there are no more requirements nodes needing to be matched and replaced by an infrastructure element. At this point, a possible solution has been found. This solution is recorded as being "in consideration", and searching continues for other solutions by trying other choices where multiple infrastructure elements were found which matched a requirement node.

If a requirements node is encountered for which there is no matching infrastructure element which satisfies this requirements node, then the search process fails for this particular case. Other solutions may be searched for by trying other choices where multiple infrastructure elements were found which matched some requirement node.

All of the possibilities that are in consideration are ranked according to the attributes which are to be maximized and/or minimized. If there is more than one of these optimization criteria, then their relative importance (rank) is specified, and used to guide the ranking process.

Ranking these solutions may include a methodology for deriving an optimal deployment of a distributed application by iteratively matching its requirements with the capabilities of infrastructure descriptors, and then raking the resultant set of potential solutions according to optimization criteria. The optimization criteria may include value or set of values that that can be employed in a given application or setting to assist in determining a best or optimal solution.

Figure 6:
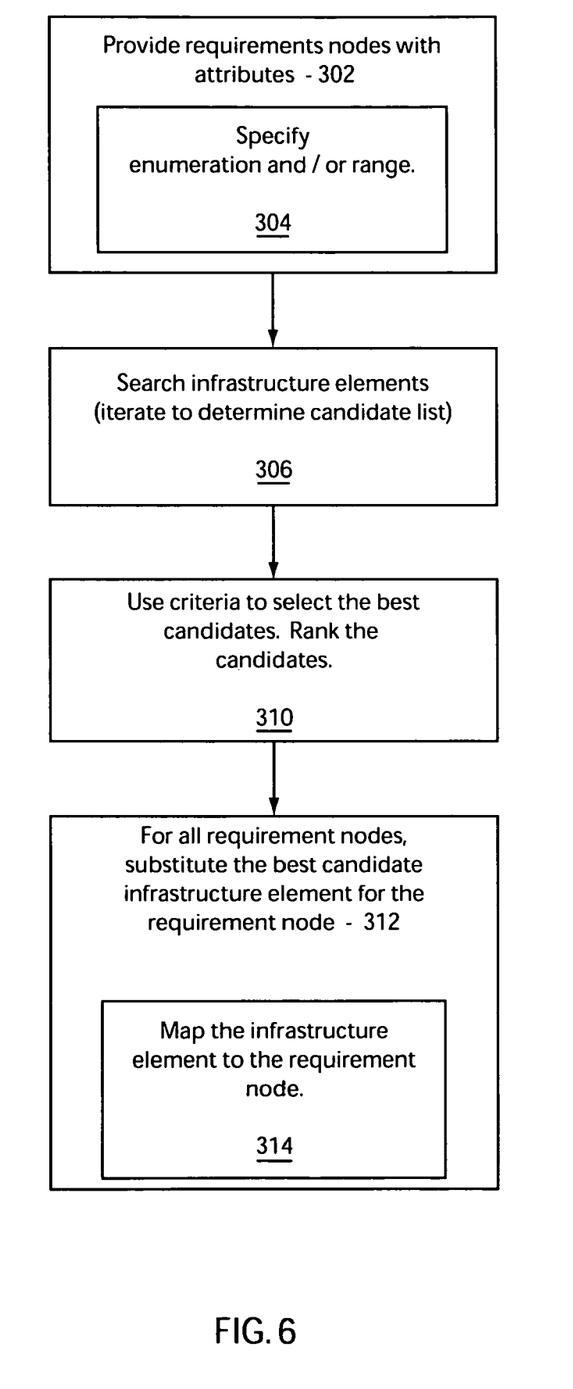
FIG. 6 is a block/flow diagram showing a system/method for deployment of a distributed application using constraint propagation in accordance with present principles.

Referring to FIG. 6, a block/flow diagram illustratively depicts a system/method for deployment of a distributed application using constraint propagation (e.g., attributes). In block 302, for an application description, a node or nodes with at least one requirement attribute are provided. These nodes are preferably requirements nodes. The requirements attribute may specify a memory capacity, a version, a rate, etc. Block 302 includes specifying an enumeration or a range for each requirement attribute in block 304.

In block 306, a repository is searched for candidate infrastructure elements that satisfy the at least one requirement attribute. This includes returning infrastructure elements with a requirement attribute equal to the enumeration or within the range. Each infrastructure element may include at least one unit node and at least one requirement node related to the at least one unit. Block 306 may include iteratively searching the infrastructure elements for each node with at least one requirement attribute to determine a list of best candidate infrastructure elements for each node.

In block 310, a criterion or criteria (e.g., cost, performance, etc.) are employed to determine the best candidate infrastructure elements. The candidate infrastructure elements are ranked to determine an infrastructure element that best satisfies the at least one requirement attribute.

In block 312, a candidate infrastructure element that best satisfies the at least one requirement attribute in the application description is substituted for the node with the at least one requirement attribute. Block 312 may include substituting the best candidate infrastructure element at each node.

In block 314, an infrastructure element (e.g., the best ranked) from the repository is mapped to the node. This may be performed by a mapping algorithm associated with the infrastructure element, which takes the input values for attributes from the node and adopt these values in the infrastructure element.

Figure 7:
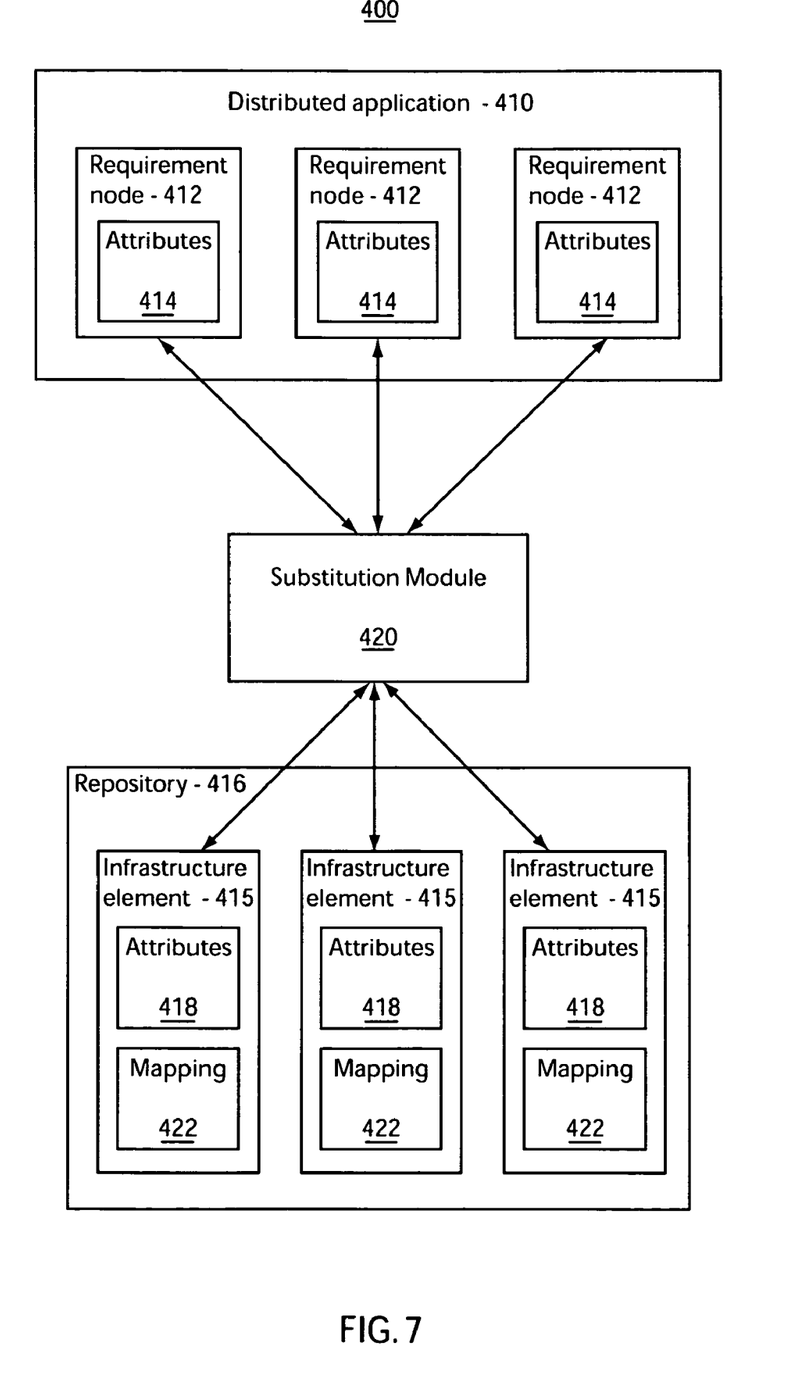
FIG. 7 is a block/flow diagram showing a system/method for deployment of a distributed application design system in accordance with present principles.

Referring to FIG. 7, a distributed application design system 400 is illustratively depicted in accordance with the present principles. A distributed application 410 includes at least one requirement node 412. The requirement nodes have an application descriptor or attribute 414 to represent capabilities of the distributed application. A repository 416 of infrastructure elements includes one or more infrastructure elements 415 having requirement descriptors or attributes 418 representing capabilities of instances of the infrastructure element.

A substitution module 420 is configured to automatically substitute an infrastructure element from the repository 416 with a requirement node based upon a best match between the application descriptor 414 and the requirement descriptors 418. The substitution module 420 searches the repository and returns infrastructure elements with requirement descriptors equal to or within a range of the application descriptors. The substitution module 420 may also be employed to rank the infrastructure elements in accordance with criteria for the best match.

The application descriptors 414 and the requirement descriptors 418 preferably include enumeration attributes and/or range attributes. The infrastructure elements 415 each include a mapping algorithm 422 to map the infrastructure element 415 to the requirement node 412. Each infrastructure element may include at least one unit node and at least one requirement node related to the at least one unit node. The at least one unit node of each infrastructure element may include the requirement descriptors for comparison with the requirement node of the distributed application. The application descriptors and the requirement descriptors may specify memory capacity, a version, a rate, or any other attribute.

Having described preferred embodiments of a system and method for automated design for deployment of a distributed application using constraint propagation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for automated design deployment for distributed applications, comprising:
   in an application description, providing a node with at least one requirement attribute;
   searching a repository for candidate infrastructure elements that satisfy the at least one requirement attribute; and
   substituting a candidate infrastructure element that best satisfies the at least one requirement attribute in the application description in place of the node with the at least one requirement attribute.

2. The method as recited in claim 1, wherein providing a node with at least one requirement attribute includes specifying an enumeration or a range for each requirement attribute.

3. The method as recited in claim 2, wherein searching the repository returns infrastructure elements with a requirement attribute equal to the enumeration or within the range.

4. The method as recited in claim 1, further comprising ranking infrastructure elements to determine an infrastructure element that best satisfies the at least one requirement attribute.

5. The method as recited in claim 1, wherein substituting includes mapping an infrastructure element from the repository to the node.

6. The method as recited in claim 1, wherein mapping includes providing a mapping algorithm for each infrastructure element wherein the mapping algorithm maps a best candidate infrastructure element's requirements to the at least one requirement attribute's requirements.

7. The method as recited in claim 1, wherein each infrastructure element includes at least one unit and at least one requirement related to the at least one unit.

8. The method as recited in claim 1, further comprising iteratively searching the infrastructure elements for each node with at least one requirement attribute to determine a best candidate infrastructure element for each node.

9. The method as recited in claim 8, further comprising substituting the best candidate infrastructure element at each node.

10. A computer program product for automated design deployment for distributed applications comprising a computer readable storage medium including a computer readable program, wherein the computer readable program when executed on a computer causes the computer to perform the steps of:
    in an application description, providing a node with at least one requirement attribute;
    searching a repository for candidate infrastructure elements that satisfy the at least one requirement attribute; and
    substituting a candidate infrastructure element that best satisfies the at least one requirement attribute in the application description in place of the node with at least one requirement attribute.

11. The computer program product as recited in claim 10, further comprising ranking infrastructure elements to determine an infrastructure element that best satisfies the at least one requirement attribute.

12. The computer program product as recited in claim 10, wherein substituting includes mapping an infrastructure element from the repository to the node.

13. A distributed application design system, comprising:
    a distributed application stored on a computer readable storage medium including at least one requirement node, the requirement node including an application descriptor to represent capabilities of the distributed application;
    a repository of infrastructure elements, the infrastructure elements having requirement descriptors representing capabilities of instances of the infrastructure element; and
    a substitution module configured to automatically substitute an infrastructure element from the repository with a requirement node based upon a best match between the application descriptor and the requirement descriptors.

14. The system as recited in claim 13, wherein the application descriptor and the requirement descriptors include at least one of enumeration attributes and range attributes.

15. The system as recited in claim 13, wherein the infrastructure elements each include a mapping algorithm to map the infrastructure element to the requirement node.

16. The system as recited in claim 13, wherein the substitution module searches the repository and returns infrastructure elements with requirement descriptors equal to or within a range of the application descriptors.

17. The system as recited in claim 13, wherein the substitution module ranks infrastructure elements in accordance with criteria for the best match.

18. The system as recited in claim 13, wherein each infrastructure element includes at least one unit node and at least one requirement node related to the at least one unit node.

19. The system as recited in claim 16, wherein the at least one unit node of each infrastructure element includes the requirement descriptors for comparison with the requirement node of the distributed application.

20. The system as recited in claim 13, wherein the application descriptor and the requirement descriptors specify one of a memory capacity, a version, and a rate.

* * * * *